United States Patent
Ponzio et al.

(10) Patent No.: US 6,848,646 B2
(45) Date of Patent: Feb. 1, 2005

(54) METHOD AND DEVICE FOR GUIDING THE WIRE ON MULTI-POLE STATORS WOUND BY A FLIER-TYPE MACHINE

(75) Inventors: Massimo Ponzio, Barberino V. Elsa (FI) (IT); Roberto Giachetti, Florence (IT)

(73) Assignee: ATOP SpA, Barberino V. Elsa (IT)

( * ) Notice: Subject to any disclaimer, the term of this patent is extended or adjusted under 35 U.S.C. 154(b) by 0 days.

(21) Appl. No.: 10/330,832

(22) Filed: Dec. 27, 2002

(65) Prior Publication Data

US 2003/0150951 A1 Aug. 14, 2003

(30) Foreign Application Priority Data

Dec. 28, 2001 (EP) .............................................. 01830825

(51) Int. Cl.[7] .............................................. H02K 15/09
(52) U.S. Cl. ..................................... 242/433.4; 29/596
(58) Field of Search ............................. 242/433.4, 433, 242/441, 439.1; 29/596

(56) References Cited

U.S. PATENT DOCUMENTS 5,257,745 A * 11/1993 Lombardi et al. ........ 242/433.4
6,386,474 B1 * 5/2002 Luciani .................... 242/433.4

FOREIGN PATENT DOCUMENTS

| JP | 49114703 | 11/1974 |
|----|----------|---------|
| JP | 51031804 | 3/1976 |
| JP | 55037821 | 3/1980 |
| JP | 59006750 | 1/1984 |
| JP | 61172321 | 8/1986 |
| JP | 63052655 | 3/1988 |
| JP | 02111245 | 4/1990 |
| JP | 06153464 | 5/1994 |
| JP | 09117113 | 5/1997 |
| JP | 10112962 | 4/1998 |

* cited by examiner

Primary Examiner—Emmanuel Marcelo
(74) Attorney, Agent, or Firm—Simpson & Simpson, PLLC

(57) ABSTRACT

A method for guiding the wire (8) on multi-pole stators (1) that can be wound by a flier-type machine, wherein the stators (1) have a core (3) with poles (4) defining between them a plurality of grooves (5), and wherein the wire (8) is wound about the poles (4) guided by first fixed shrouds (11) and second mobile shrouds (12"), which move radially for laying the wire (8) along the poles same. At winding the approaching step of third shrouds (21) against the boundary of the pole (4) is provided. The third shrouds (21) and the second shrouds (12") move integrally when approaching or moving away with respect to the stator, whereas during the winding step they are movable relative to each other, so that the third shrouds (21) are fixed against the stator (1) and guide the wire (8) in the grooves (5), whereas the second shrouds (12") move for laying the wire (8) about the poles (4).

7 Claims, 4 Drawing Sheets

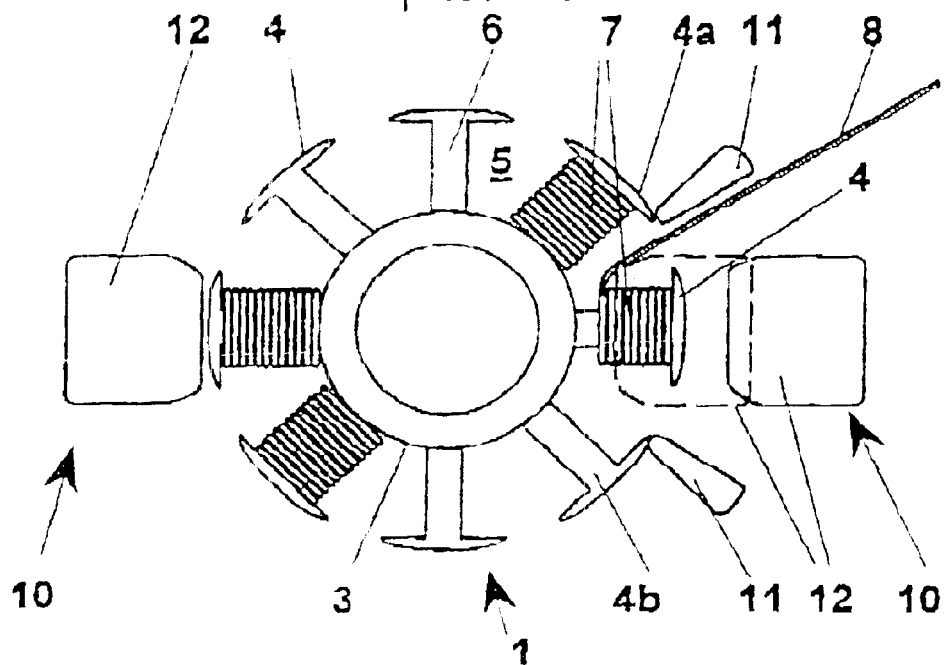
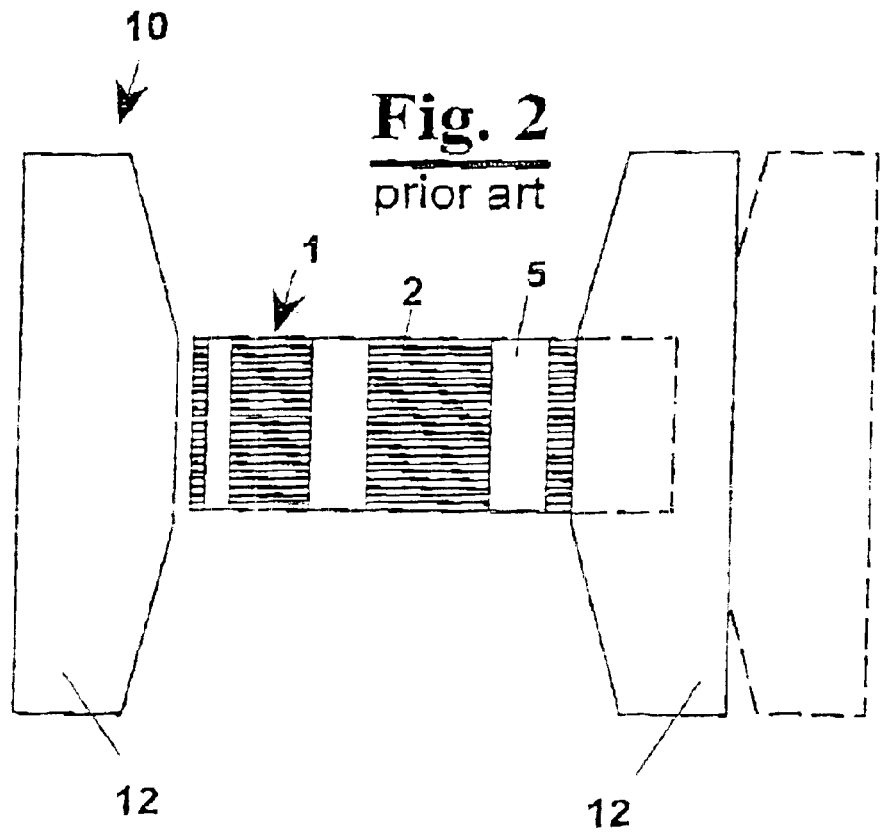

METHOD AND DEVICE FOR GUIDING THE WIRE ON MULTI-POLE STATORS WOUND BY A FLIER-TYPE MACHINE

CROSS REFERENCE TO RELATED APPLICATION

The present application claims benefit to European Patent Application No. 01830825.4, filed on Dec. 28, 2001.

1. Field of the Invention

The present invention relates to the field of stator winding machines, and precisely it relates to a method for guiding the wire on multi-pole stators that can be wound by a flier-type machine.

The invention relates furthermore to a device that carries out this method.

2. Background of the Invention

Multi-pole stators are known that can be wound by a flier-type machine, having a stack of sheets substantially star-shaped forming a plurality of poles that extend starting from a tubular core. The stators of this type fit either with an inner armature or with a concentric outer ring-shaped armature. They are very common in brushless motors and generators.

The adjacent boundaries of the poles define substantially a cylinder with a plurality of longitudinal or oblique slits.

The boundaries of the poles are connected to the core by means of branches that, between one another, define a plurality of grooves. Such grooves have to be filled of wire by coils wound about the branches. At winding the wire must pass beyond necessarily through the slits for reaching the grooves, and has to be guided to avoid hitting against the edges of the slits.

Winding machines are known capable of winding the wire in the grooves of the stator poles. They provide a winding arm, or flier, which rotates causing the wire to follow a circular trajectory thus laying the coil about each pole. The wire follows the circular trajectory while it is guided in the slits at the sides of each pole by means of shrouds having round profile, normally of two types:

a couple of lateral guiding plates, which define substantially a funnel that guides the wire in the slits; collisions are thus avoided of the wire against the edges of the adjacent poles to the pole that is being wound;
 a shroud that allows the wire to pass beyond around the pole making substantially a double chute guide that moves the wire away from its own circular trajectory and brings it to wind about the pole branch; the shroud normally is movable towards/away from the axis of the stator for laying uniformly the wire along the pole branch.

The two types of shrouds are normally sufficient to wind most of the common types of multi-pole stators that can be wound by a flier-type machine.

The shroud can be in one or in two parts. In the first case, it has a central opening in which the pole can enter. This is used when the width of the pole is similar to that of the winding and the slits are wide enough to allow its passage. In the second case, the shroud comprises two halves that are closed after having passed the slits at the end of the approaching movement. Also in this case, the width of the pole is similar to that of the winding but the slits are as narrow as possible, for improving the performances of the motor.

However, many stators of this type, studied mostly for efficiency reasons than for a easy winding, they are wound with difficulty, owing to the shape of the slot and to the dimension of the pole. For example, in the stators of large diameter the poles may be very wide, which extends far beyond the portion of groove to fill with the coil.

Therefore, the drawbacks are a not uniform filling of the slot or the risk of hits of the wire against the pole, with impossibility to obtain a complete filling.

In many cases, moreover, winding is geometrically impossible with the shrouds of known art. To overcome this drawback, the stator is split into many parts, assembling eventually the boundary of the stator only after winding. This, however, has the drawback of a more expensive and complicated production process.

SUMMARY OF THE INVENTION

It is therefore object of the present invention to provide a method for guiding the wire on multi-pole stators that avoids splitting the stator even if allowing a most favourable filling of the slot and an uniform distribution of the wire.

It is particular object of the invention to provide such a method wherein:

the movement of the shroud is not limited, to avoid that the wire can collide with the pole and can move for laying the wire along all the pole branch;
 in case of stators of large diameter and with large grooves to fill, the wire can easy pass beyond the pole boundary for entering the grooves.

Therefore, according to the invention, a method for guiding the wire on multi-pole stators that can be wound by a flier-type machine, wherein the stators have a core from which a plurality of branches radially extend defining grooves and having pole boundaries, said pole boundaries having longitudinal edges, which define slits for reaching the grooves and circumferential edges that define the height of the stator,
 and wherein the wire is wound about said branches by means of a rotatable arm guided by first fixed shrouds, which define substantially a funnel to avoid hits of the wire against the longitudinal edges of adjacent poles, and second shrouds, which define a couple of chute guides that pass beyond the circumferential edges of the pole and move radially for laying the wire along the branches,
 provides the approaching of third shrouds against the boundary of the pole that guide at winding the wire to avoid hits of the wire against the longitudinal edges of the pole same.

Preferably, the third shrouds and the second shrouds
 in a first step they approach integrally the stator,
 in a second step, at winding, they are movable relative to each other, the third shrouds remaining fixed against the stator and the second shrouds reciprocating for laying the wire about one pole;
 in a third step move away integrally from the stator.

Advantageously, the third shrouds and the second shrouds are movable relative to each other urged by an elastic force.

According to another aspect of the invention, in a stator winding machine of the above type, comprising a rotatable arm suitable for winding the wire about said branches, first fixed shrouds that define a funnel to avoid hits of the wire against the longitudinal edges of adjacent poles, and second shrouds that define a couple of chute guides that pass beyond the circumferential edges of the pole and that move radially for laying the wire along the branches, third shrouds are provided that approach the boundary of the pole from outside at winding and guide the wire to avoid hits of the wire against the longitudinal edges of the pole same.

Preferably, the third shrouds are slidingly mounted with respect to a support of said second shrouds whereby the approaching of said shrouds towards said pole causes the contact of said third shrouds with the pole same at their lateral edges, and the further radial movement of said shrouds towards the axis of the stator is allowed by the relative reciprocation of said third shrouds with respect to said support.

BRIEF DESCRIPTION OF THE DRAWINGS

Further characteristics and the advantages of the method and of the device according to the invention for guiding the wire on multi-pole stators will be made clearer with the following description of an embodiment thereof, exemplifying but not limitative, with reference to the attached drawings, wherein:

FIGS. 1 and 2 are respectively a top plan and an elevation side view of a step for guiding the wire on a multi-pole stator according to the prior art, comprising a shroud mobile;

DESCRIPTION OF A PREFERRED EMBODIMENT

Figure 3:
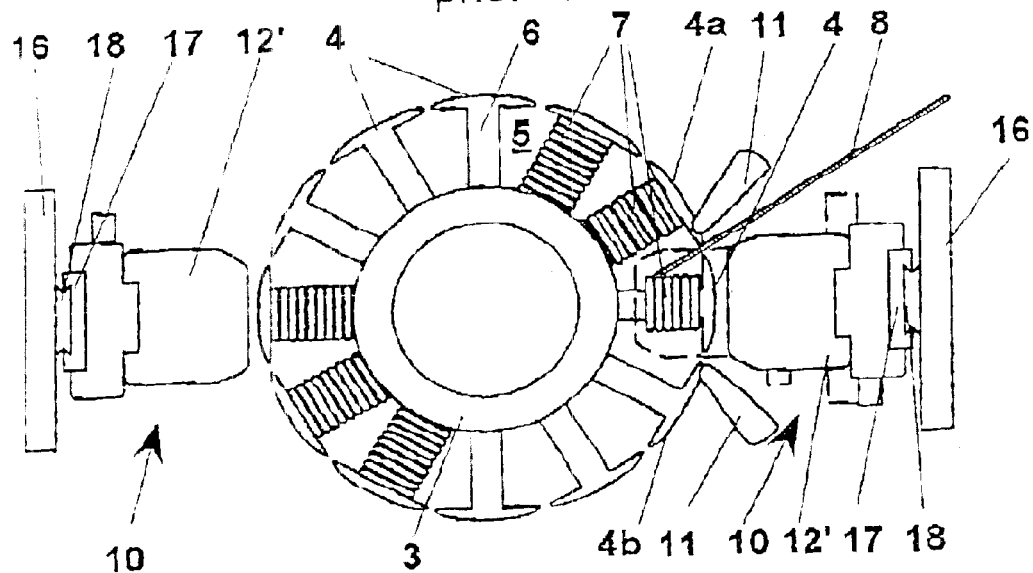
FIGS. 3 and 4 are respectively a top plan and an elevation side view of a step for guiding the wire on a multi-pole stator according to the prior art, comprising a mobile shroud.

With reference to figures from 1 to 4, according to the prior art, a stator 1 that can be wound by a flier-type machine is formed by a substantially star-shaped stack of sheets 2, from which a plurality of poles 4 extend starting from a tubular core 3. The boundaries of poles 4, form together substantially a cylinder with a plurality of longitudinal grooves 5. The pole boundaries are connected to the core by means of branches 6 about which coils 7 are wound.

A winding machine, not shown, comprises a flier, which is also not shown, that rotates laying the wire 8 about the pole branch 6, and creating thus a coil 7 on each pole. For guiding the wire 8 at the sides of each pole 4 on which is being wound, shroud device 10 is provided having a couple of lateral guiding plates 11, which define substantially a funnel that guides the wire in the grooves 5. Collisions are thus avoided of the wire against the edges of poles 4a and 4b adjacent to the pole 4 that is being wound.

In the solution of FIGS. 1 and 2, the device 10 comprises a shroud 12 that allows the wire 8 to overcome the pole 4, defining substantially a upper and lower chute guide that moves the wire 8 away from its own circular trajectory and brings it to wind about the pole branch 6. Shroud 12 normally is movable towards/away from the axis of the stator, up to the position indicated with dashed line, for laying uniformly the wire along the pole branch. To avoid any collision with the pole 4 of the stator, it has a centre front opening, not shown, in which the pole 4 enters. This type of shroud 12 is suitable for pole boundaries 4 of dimension not very larger than the size of the coil, and that that do not have too small slits.

Figure 4:
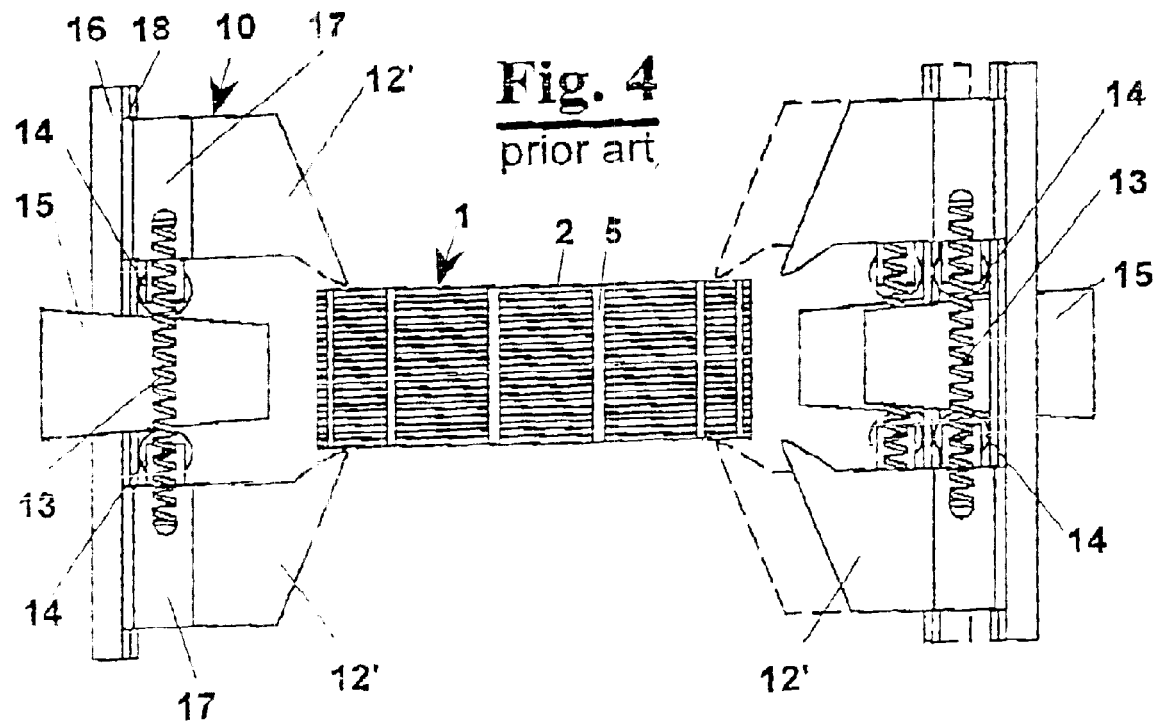

In the solution of prior art of FIGS. 3 and 4, instead, shroud 12 has shroud halves 12' that can approach each other by means of a cam 15, which pushes against outer rollers 14 integral to shrouds 12', biasing a spring 13. The shroud halves 12' are mounted slidingly on a support 16 by means of a slide 17 that engages with a guide 18. This type of shroud with shroud halves 12' is suitable for pole boundaries 4 of size not very larger than the size of the coil and that define other slits smaller than the previous case.

Figure 5:
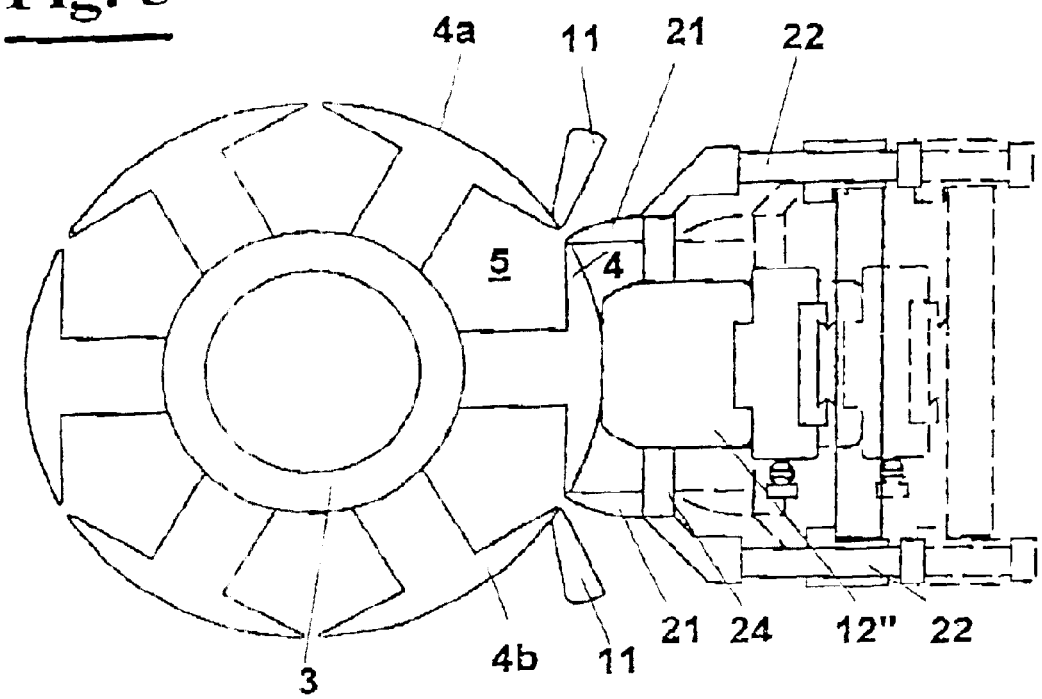
FIGS. 5 and 6 are respectively a top plan and an elevation side view of a step of pre-winding according to the invention of a multi-pole stator, comprising a mobile shroud to which a shield is associated for covering the pole.
Figure 6:
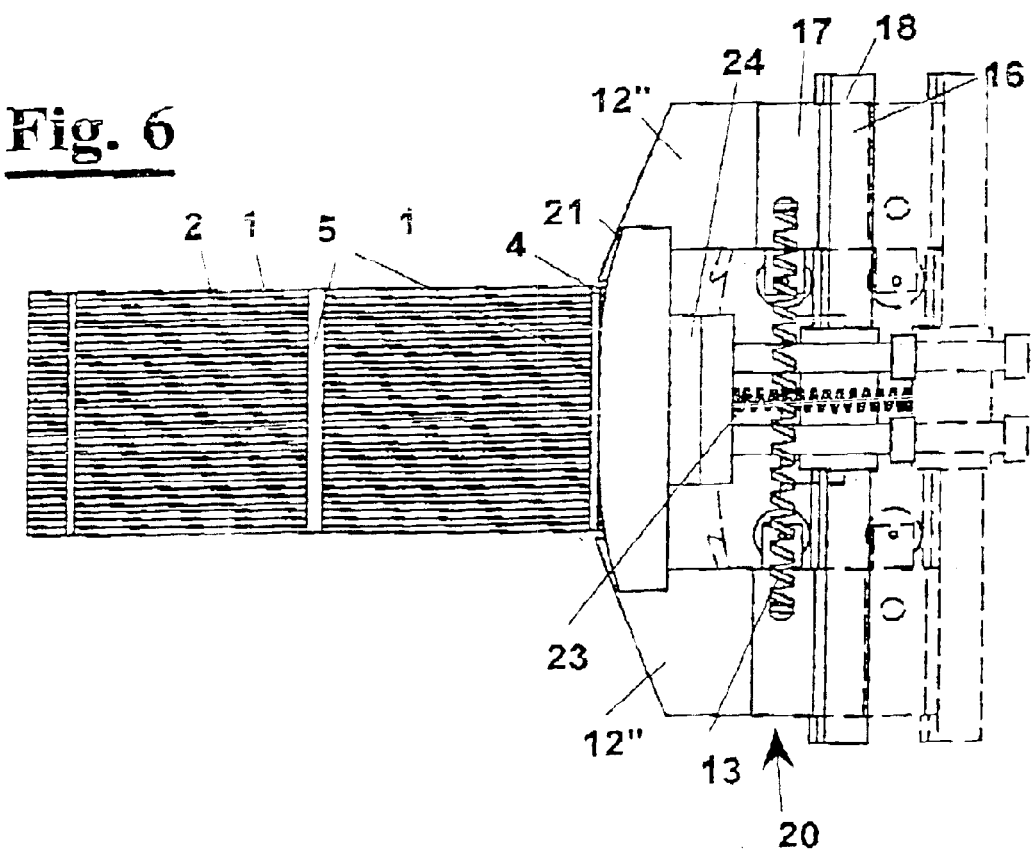

With reference to FIGS. 5 and 6, for a geometry of stators 1 similar to that of figures from 1 to 4, but with different geometry, a shielding device 20 is provided according to the invention. Its feature is that the movement of shrouds 12" does not cause the collision of wire 8 with pole 4, with the consequence that the shrouds 12" can freely move and lay the wire about all the pole branch 6.

According to the invention, at winding, against the boundary of the pole 4 third shrouds 21 do approach, that guide the wire 8 to avoid hits of the wire against the longitudinal edges of the pole same.

More precisely, the third shrouds 21 are slidingly mounted with respect to the support 16 by means of guiding rods 22 biased by a spring 23. Third shrouds 21 are connected to each other by a transversal plate 24.

Figure 7:
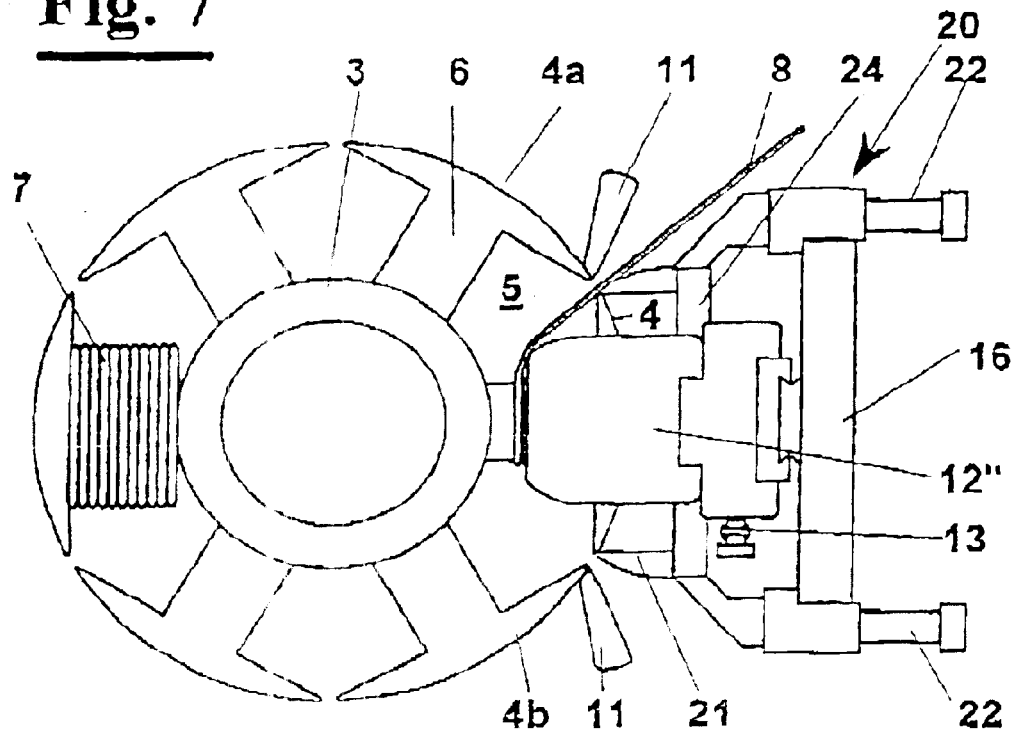
FIGS. 7 and 8 are respectively a top plan and an elevation side view of a winding step following the step of FIGS. 5 and 6.
Figure 8:
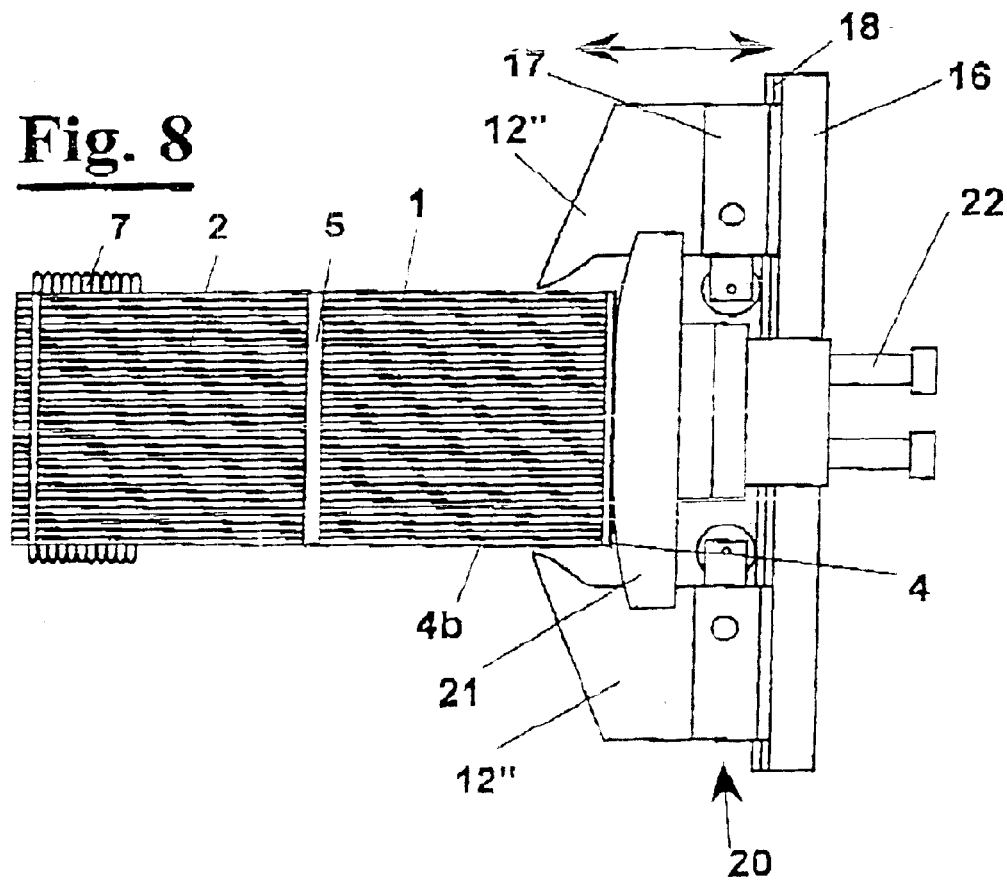

As shown in FIGS. 3 and 4, starting from the position indicated with a dashed line, the integral approaching movement of device 20 towards pole 4 being wound ends with the contact between third shrouds 21 and pole 4 same, at the longitudinal edges thereof. Then, with reference to FIGS. 7 and 8, the further radial movement of the support 16 towards the axis of stator 1 is allowed by the relative movement of the guiding rods 22 with respect to support 16, biased by spring 23.

This way, the shrouds 12" can move radially without that wire 8 collides against the pole 4, assured by the presence of third shrouds 21.

The new solution above presented has the advantage to allow winding many types of stators having special geometry, which differ from the typology shown in figures from 1 to 4, and whose winding is not possible with the known systems.

Concerning the opening movement of shrouds 12" biased by spring 13, for laying more layers of wire 8 and forming the coils 7, it is similar to that shown in FIG. 3, by means of cam 15, and then not shown in detail. Obviously, in association to the inventive concept of the presence of third shrouds 21 and of the relative movement with respect to shroud halves 12", the movement of opening/closure of the shrouds can be made in any desired other way.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. A method for guiding a wire (8) on multi-pole stators (1) that can be wound by a flier-type machine, wherein said stators (1) have a core (3) from which a plurality of branches (6) radially extend with poles (4) defining between them grooves (5), said poles (4) having longitudinal edges, which define slits for reaching the grooves (5), and circumferential edges, which define the stack height of the stator, and wherein the wire (8) is wound about said branches (6) by means of at least a rotatable arm guided by first fixed shrouds (11), which define a funnel to avoid hits of the wire (8) against the longitudinal edges of adjacent poles (4a,4b), and second mobile shrouds (12"), which define a couple of chute guides that pass beyond the circumferential edges of the pole (4) and that move radially for laying the wire (8) along the branches (6), characterised in that at winding an approaching step is provided by third shrouds (21) fixed in position against an outer radial boundary of the pole (4), said third shrouds (21) guiding the wire (8) to avoid hits of the wire (8) against the longitudinal edges of the pole.

2. Method according to claim 1, wherein said third shrouds (21) and said second shrouds (12')

in a first step they approach integrally said stator, in a second step, at winding, they are movable relative to each other, said third shrouds (21) remaining fixed against said stator (1) and said second shrouds (12') reciprocating for laying the wire (8) in one of said grooves (5);

in a third step they move away integrally from said stator.

3. Method according to claim 2, wherein said third shrouds (21) and said second shrouds (12') are movable relative to each other biased by a resilient force (23).

4. Device (20) for guiding a wire (8) on multi-pole stators (1) that can be wound by a flier-type machine, wherein said stators (1) have a core (3) from which a plurality of branches radially extend (6) with poles (4) defining a plurality of grooves (5), said poles (4) having longitudinal edges, which define slits for reaching the grooves (5), and circumferential edges that define the height (2) of the stator (1), comprising a rotatable arm suitable for winding the wire (8) about said branches (6), first fixed shrouds (11) that define a funnel to avoid hits of the wire (8) against the longitudinal edges of adjacent poles (4), and second shrouds (12") that define a couple of chute guides that pass beyond the circumferential edges of the pole (4) and that move radially for laying the wire (8) along the branches (6), characterised in that third shrouds (21) are provided that, at winding, approach and do not extend beyond an outer radial boundary of the pole from outside (4) and guide the wire (8) to avoid hits of the wire (8) against the longitudinal edges of the pole (4).

5. Device according to claim 4, wherein said third shrouds (21) are slidingly mounted with respect to a support (18) of said second shrouds (12") whereby the approaching of said second shrouds (12") towards said pole (4) causes the contact of said third shrouds (21) with the pole (4) same at their lateral edges, and the further radial movement of said second shrouds (12") towards the axis of the stator is allowed by the relative movement of said third shrouds (21) with respect to said support.

6. Device according to claim 4, wherein said third shrouds (21) are slidingly mounted with respect to a support (18) of said second shrouds (12") by means of guiding rods (22) biased by a spring (23).

7. Device according to claim 4, wherein said third shrouds (21) are connected to each other by a plate substantially parallel to said axis of said stator.

* * * * *